United States Patent

[11] 3,612,432

[72] Inventor Richard M. Johnson
Dallas, Tex.
[21] Appl. No. 16,170
[22] Filed Mar. 3, 1970
[45] Patented Oct. 12, 1971
[73] Assignee International Computer Products, Inc.
Addison, Tex.

[54] TAPE UNIT CASSETTE HOLDER
14 Claims, 12 Drawing Figs.

[52] U.S. Cl. .......... 242/198
[51] Int. Cl. .......... G03b 1/04, G11b 15/32, G11b 23/04
[50] Field of Search .......... 242/55.19 A, 197–200; 274/4; 206/52 F; 352/72, 78

[56] References Cited

UNITED STATES PATENTS

| | | | |
|---|---|---|---|
| 2,969,929 | 1/1961 | Rudzitis | 242/199 |
| 3,167,267 | 1/1965 | Crane | 242/198 |
| 3,348,786 | 10/1967 | Miller et al. | 242/200 |

*Primary Examiner*—Leonard D. Christian
*Attorneys*—Giles C. Clegg, Jr. and Peter J. Murphy

ABSTRACT: A vertically oriented mounting plate supports an upward facing recording head. The mounting plate includes brackets and guides for locating the cassette both vertically and laterally relative to the recording head and other components. The cassette is received in the holder at an angle from the vertically oriented plate, with its lower edge guided to correct position. Manual urging of the cassette to a position parallel to the plate automatically latches the cassette in operative position, with the cassette spools being positioned over the drive spindle hubs. The spindle hubs give way should there be misalignment of the hubs and the cassette spools.

PATENTED OCT 12 1971 3,612,432
SHEET 1 OF 5
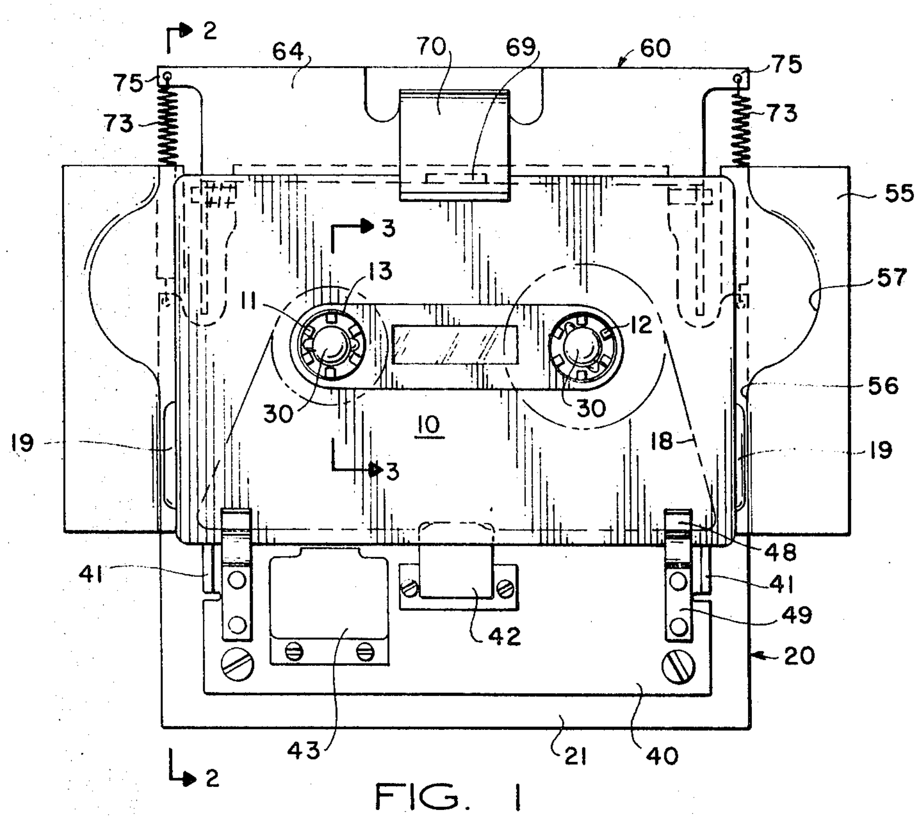
FIG. 1
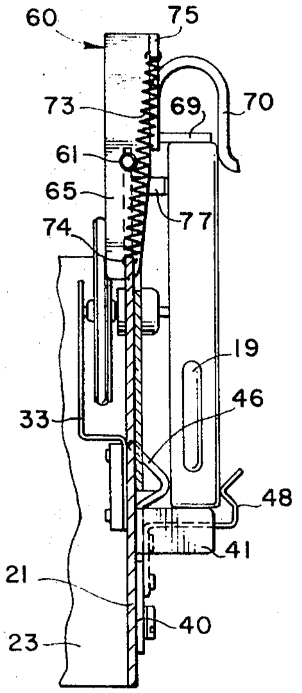
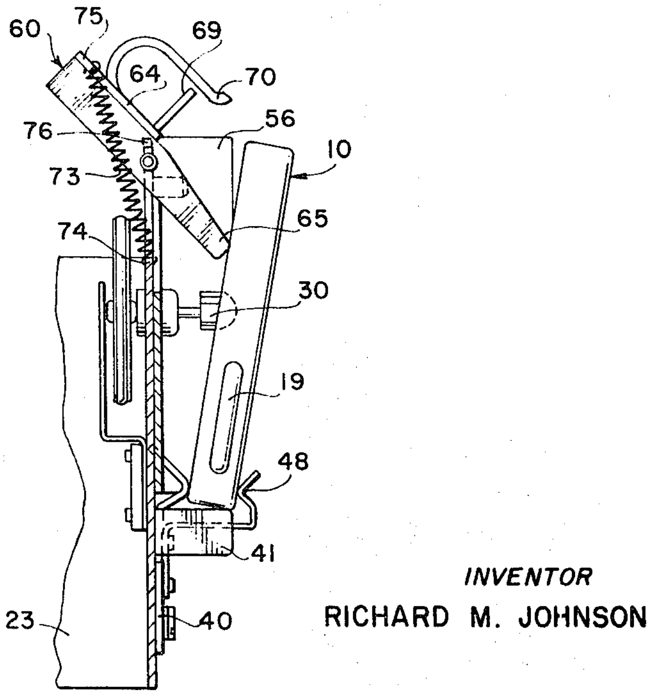
FIG. 2 FIG. 5
*INVENTOR*
RICHARD M. JOHNSON
*ATTORNEYS*

INVENTOR
RICHARD M. JOHNSON

ATTORNEYS

INVENTOR

RICHARD M. JOHNSON

ATTORNEYS

INVENTOR
RICHARD M. JOHNSON

ATTORNEYS

INVENTOR
RICHARD M. JOHNSON

Gil, [signature]

ATTORNEYS

TAPE UNIT CASSETTE HOLDER

BACKGROUND OF THE INVENTION

This invention relates to a magnetic tape unit for use with a tape cassette and particularly to the mechanism for positioning and supporting a tape cassette in the unit.

In the use of magnetic tape systems as interface equipment for computers, it is desirable that the movement of the magnetic tape relative to the recording head and/or other control devices be precisely controlled. In larger tape units where the speed and drive of the tape is controlled by capstans which may be positioned fairly close to the recording head or other critical component, such control is more readily obtained than it is for a smaller tape unit using cassette-loading tape. With cassette tape units, where the drive and control of tape movement are through the cassette spools, it is important that the cassette be positioned and latched precisely in the tape unit relative to the recording head, the drive spindles, and control detectors; and it is also desirable that this positioning be accomplished while at the same time providing for ease of loading and unloading the cassette from the tape unit.

An object of this invention is to provide a cassette tape unit having improved means for locating the cassette relative to the recording head and drive spindles.

Another object of this invention is to provide a cassette tape unit having an upward facing recording head and improved means for loading and unloading the tape cassette.

A further object of this invention is to provide a cassette tape unit having improved means for loading and unloading the tape cassette.

A further object of this invention is to provide a cassette tape unit having improved means for accommodating spindle cassette spool misalignment during the loading of the cassette.

A still further object of this invention is to provide a cassette tape unit having an improved spindle design for maintaining concentricity of the drive spindles and cassette spool.

For accomplishing these objects, a tape unit according to the invention includes a frame having support means mounted thereon for supporting the lower edge of the cassette, and having latch means mounted thereon for supporting the upper portion of the cassette. The frame also supports the recording head, for engagement with the tape passing adjacent to the bottom edge of the cassette, drive spindles for driving the cassette spool, and other components. The support means and the latch means define an operating plane for the cassette, wherein the cassette is positioned to be driven by the drive spindles, and a loading plane which is angled relative to the operating plane. The support means supports the cassette lower edge in both planes. The latch means, in the unlatch position, has an arm engaging the cassette to position it in the loading plane and, in the latch position, has means of engaging the upper portion of the cassette to retain it in the operating plane.

DRAWINGS

The novel features of the invention, as well as additional objects and advantages thereof, will be understood more fully from the following description when read in connection with the accompanying drawings in which:

FIG. 1 is a front elevation view of a cassette holder according to the invention, with a cassette latched in operating position;

FIG. 2 is a side view taken along the line 2—2 of FIG. 1;

FIG. 5 is a side view, similar to FIG. 2, showing the cassette in position for loading or unloading;

DESCRIPTION OF THE PREFERRED EMBODIMENT

The several figures of the drawings are views of a "tape unit" which may also be described as a "tape module" or "-tape transport"; and this unit may be mounted in a cabinet containing other similar tape units or other apparatus associated with a computer for example.

Figure 3:
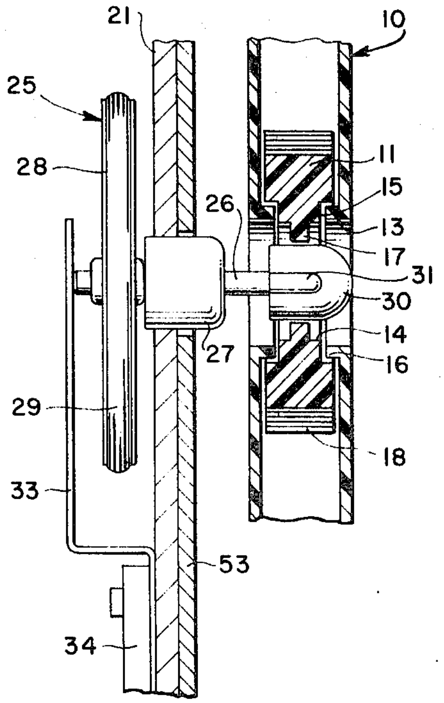
FIG. 3 is a fragmentary sectional view taken along the line 3—3 of FIG. 1.

The tape unit is particularly adapted for use with a tape cassette 10 having a standardized configuration for the handling of ⅛-in. magnetic tape for example. A cassette, as best shown in FIGS. 1, 2 and 3, may include a flat rectangular housing fabricated of a plastic material and having the approximate dimensions: 4 in. by 2½ in. by three-eighth in. The cassette includes two tape spools 11 and 12 which are rotatably mounted within the housing about spaced openings 13, with the spools having axial bores 14 exposed through the openings 13 for driving engagement by respective drive hubs of the tape unit to be described. As best seen in FIG. 3, the spool 11 consists of a disclike wheel having opposed axial recesses 15 in the opposite faces which receive circular bosses 16 formed in the confronting walls of the cassette housing and to define rotational support for the spool 11. Six integral, radially inward directed teeth 17 are equally spaced within the spool axial bore for engagement by a driving hub. In FIG. 1, the tape and its path are illustrated within the cassette by means of broken lines 18; and it will be seen that the tape 18 traverses a path adjacent to the bottom edge of the cassette in its movement from one spool to the other. The side edges of the cassette housing are provided with elongated ribs or bosses 19.

Figure 6:
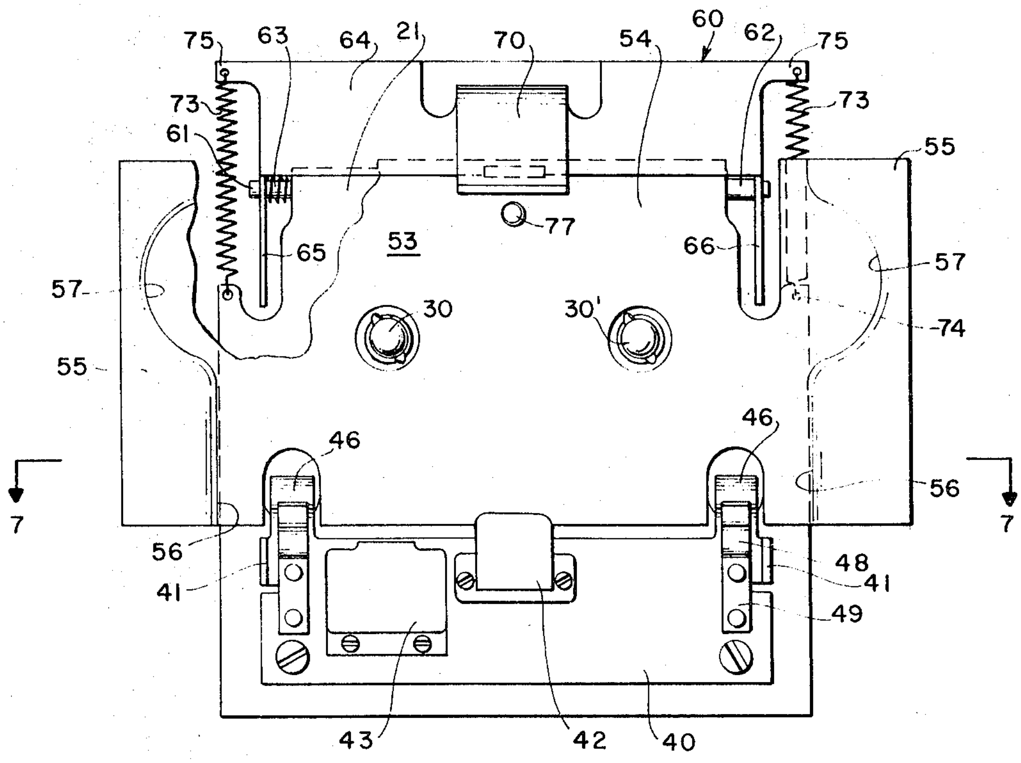
FIG. 6 is the front elevation view of the holder of FIG. 1 with the cassette removed.
Figure 7:
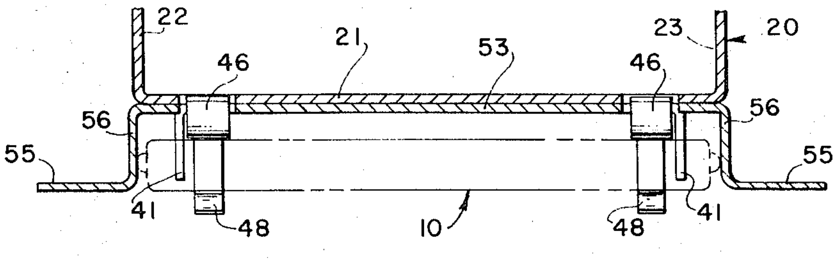
FIG. 7 is a horizontal sectional view taken along the line 7—7 of FIG. 6.

FIGS. 1 through 7 of the drawings illustrate a preferred form of tape unit which includes a base frame 20 which supports the other elements to be described and which is configured to be mounted in a cabinet with other equipment as indicated above. As best seen in FIGS. 1 and 7, the frame 20 includes a front plate 21 which is oriented in a vertical plane as illustrated in the drawings, and a sideplate 22 and 23 for mounting the frame 20. The front plate 21 supports the drive spindles for the spools 11 and 12, the means for supporting the above-described tape cassette, and the magnetic recording head, all of which are referred to be low. The frame 20 may also support drive means and associated brake mechanism and control circuitry which are not described herein.

One form of drive spindle assembly 25, best shown in FIG. 3, consists of a drive shaft 26 rotatably supported in a bushing 27 mounted in the front plate 21. A drive wheel 28 is nonrotatably mounted on the inner end of the shaft 26, and may carry a tire 29 in the form of a rubber O-ring for example to be engaged by a driving shaft which is not shown. A hub 30 is nonrotatably affixed to the outer end of the shaft 26 and includes two radially extending teeth 31 in the form of axially elongated ribs for engagement with the teeth 17 of the cassette spools when the hub is received in driving relation with the spool as illustrated in FIG. 3. The shaft 26 is mounted for axial sliding movement within the bushing 27 so that the entire spindle assembly 26 may move axially inward, as viewed in FIG. 4, for reasons to be described. As seen in these figures, a spring member 33 mounted on the front plate 21 by means of a backing plate 34 bears against the inner end of the shaft 26 to urge the shaft and the spindle assembly to the outer limiting position shown in FIG. 3. The hub 31' of an identical spindle assembly for driving the spool 12 is illustrated in FIGS. 1 and 6.

The elements for supporting the lower edge of the cassette 10, best seen in FIGS. 1, 2, 6 and 7, are carried on a mounting plate 40 secured to the front plate 21 by means of suitable screws or bolts. The plate 40 includes a pair of stops 41 extending outwardly perpendicular to the front plate 21, which define a horizontal plane supporting the lower edge of the cassette 10 and limiting downward movement of the cassette. The supporting plane is open, between the stops 41, to provide access to the lower edges of the cassette 10 for components such as the magnetic recording and playback head 42 and a detector unit 43, both of which are rigidly mounted on the mounting plate 40 as best seen in FIG. 1. The recording head 42 is partially received in a recess provided in the lower edge of the cassette to be engaged by the tape 18 as it traverses the path adjacent to the lower edge. Of course, the position of the recording head is critical relative to the supporting plane for the cassette edge so that the tape 18 will be maintained in wiping contact with the head for accurate recording and/or playback of information.

The detector unit 43 may be a unit having a light detector to produce a signal responsive to the passage of different forms of tape, for example, to stop the tape drive. The position of such a detector unit may also be critical relative to the cassette 10.

As best seen in FIGS. 2, 6 and 7, the spacing of the cassette relative to the front plate 21 is also provided by elements integral with or attached to the mounting plate 40. The plate 40 is provided with two upwardly extending bosses 46 extending outwardly from the front plate 21 for engagement with the inner wall of the cassette 10, to limit inward movement of the cassette and to define the supporting plane of the cassette adjacent to the lower edge thereof. The cassette is maintained against the bosses 46 by means of spring clips 48 mounted on the mounting plate 40; the spring clips 48 extending outwardly beneath the lower edge of the cassette and engaging the outer face of the cassette adjacent to the lower edge to urge the cassette inwardly. By means then of the stops 41, the bosses 46 and the spring clips 48, the position of the lower edge of the cassette 10 relative to the frame 20 is precisely defined.

For positioning the cassette 10 laterally and for limiting sidewise motion thereof, a face plate 53 best shown in FIGS. 6 and 7 is mounted on the front plate 21 and secured thereto in any suitable manner. This plate is fabricated of a resilient material, such as a spring metal, and is generally rectangular in shape having a main central portion 54 which lies contiguous to the front plate 21, and side portions 55 which extend laterally beyond the frame 20. The side portions 55 are bent forwardly to define confronting sidewalls 56 and then again laterally in a plane generally parallel to the central portion 54. The side portions 55 also define finger recesses 57 permitting gripping of the side edges of the cassette. Rather than use a resilient face plate as described above, it is practical to provide a substantially rigid plate oriented as one of the side portions and a spring member oriented for biasing one side of the cassette against the rigid plate.

When the cassette is positioned in the unit, the side edge bosses 19 of the cassette engage the confronting walls 56 so that the cassette is correctly positioned laterally relative to the recording head 42 and other components. With the face plate being fabricated of a resilient material and the end portions 55 being free, the walls 56 are somewhat yieldable and act as spring means urging the cassette to the correct position. In addition to its guiding function, the face plate 53 may serve as a decorative plate for covering portions of the front plate 21. As seen particularly in FIG. 6, the face plate is provided with cutouts to accommodate other elements of the assembly.

The mechanism for guiding and securing the upper portion of the tape cassette 10, as best shown in FIGS. 1, 2, 5 and 6, consists of a latch assembly 60 hingedly mounted on the front plate 21 of the frame 20. As best seen in FIG. 6, the upper portion of the front plate 21 is provided with a pair of laterally extending ears, enclosed by sleeves 61 and 62 which define journals for the latch plate. The latch assembly includes a transverse front plate 64 and end plates 65 and 66, the end plates being vertically elongated and provided with bearing holes intermediate the ends thereof to receive the bushings 61 and 62 respectively. The transverse plate 64 lies generally above the hinge axis, and the portions of the end plates extending downwardly from the bearing holes define arms for engagement with the inner wall of the cassette 10.

The latch assembly 60 is positioned laterally relative to the frame 20 by the journal sleeve 62 which includes a larger diameter portion at its inner end providing a shoulder and thereby defining a spacer sleeve between the end plate 66 and the front plate 21; and a coiled compression spring 63 surrounding the sleeve 61 bears against the end plate 65 to urge the assembly against the spacer sleeve shoulder. The transverse plate 64 includes a forwardly extending arm 69, for engagement with the upper edge of the cassette 10, and the hook-shaped latch arm 70 for engaging the outer face of the cassette adjacent to the upper edge.

The latch assembly is normally urged to either of two selected positions by an overcenter spring arrangement, the positions being the unlatch position shown in FIG. 5 and the latch position shown in FIG. 2. As best seen in FIGS. 2, 5 and 6, a pair of tension springs 73 are connected between upwardly extending ears 74 at the edges of the front plate 21 and laterally extending ears 75 of the transverse plate 64 of the latch assembly. As seen in FIG. 2, when the latch assembly is in the latch position, the plane defined by the ears 74 and 75 lies forward of the hinge axis defined by the sleeve 61 and 62, and accordingly the latch assembly is held in this position by the springs 73. Similarly, when the latch assembly is positioned in the unlatch position, shown in FIG. 5, the plane defined by the ears 74 and 75 lies rearward of the hinge axis and the assembly is held in this position. With the transverse plate 64 bearing against an upwardly extending limit tab 76 on the front plate 21.

The operation of the tape unit 11 illustrated in FIGS. 1 through 7 will now be briefly reviewed. Prior to positioning the tape cassette within the unit, the latch assembly 60 is positioned in the unlatch position illustrated in FIG. 5. The cassette 10 is then placed in the unit with the edge having the recording head recess facing downward. It is important to note that the cassette would normally be grasped by the operator at a portion away from the exposed magnetic tape, minimizing the possibility of tape contamination. As the lower edge of the cassette portion is positioned in the unit, the edge bosses 19 engage the confronting walls 56 of the face plate to laterally guide the cassette. The cassette will engage the bosses 46 to be guided downwardly between the bosses and the spring clips 48 into engagement with the arms 41. The lower edge is then accurately positioned relative to the recording head 42 which has been received in the appropriate recess, and relative to other components such as a detector unit 43.

The upper portion of the cassette is then urged toward the front wall 21 into engagement with the arms 65 and 66 which are projecting forwardly from the front plate; and the drive hubs 30 and 30' are partially received within the cassette openings 13. The cassette is now positioned in the loading plane, and is held in this position by the action of the spring clips 48.

Further, inward pressure on the upper portion of the cassette produces a camming action moving the arms 65 and 66 to pivot the latch assembly about its hinge axis to the latch position shown in FIG. 2. In this position, the arm 69 moves into engagement with the upper edge of the cassette to assure that the cassette is seated on the supporting arms 41; and the latch arm 70 engages the front edge of the cassette to hold the upper portion of the cassette in the operating plane defined by the latch arm and a boss 77 projecting from the front plate 21 which limits inward movement of the cassette. As with the loading plane, the operating plane for the lower edge of the cassette is defined by the bosses 46 and spring clips 48. With the latch assembly held in this position by the spring 73, the cassette cannot be dislodged from the operating plane through vibration.

Figure 4:
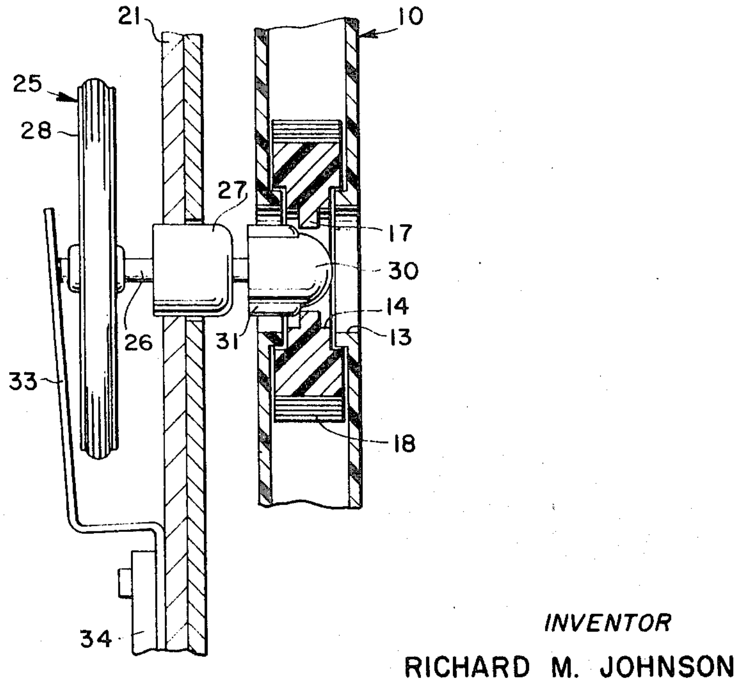
FIG. 4 is a fragmentary sectional view, similar to FIG. 3, showing the drive spindle in a displaced position.

When the cassette is moved from the loading plane position to the operating position, the drive hubs 30 and 30' are normally fully engaged with the cassette spools 11 and 12; however, this assumes that the hub teeth 31 are aligned with spaces between the spool teeth 17. Should the hub teeth 31 be precisely aligned with a pair of spool teeth 17, the hub 30 and spindle assembly will give way, as shown in FIG. 4, to permit the cassette to be moved into the operating plane without damage to the spindle assembly or to the cassette. This yielding movement of the spindle assembly 25 is permitted by the spring 33; and upon subsequent slight rotation of the hub relative to the spool, proper driving alignment will be achieved and the spindle assembly will be urged by the spring to the normal operating position of FIG. 3.

In order to remove the cassette 10 from the unit, the latch arm 70 is flipped upwardly by the operator to pivot the latch assembly 60 to the unlatch position of FIG. 5. This movement of the latch assembly automatically releases the upper edge of the cassette, and the arms 65 and 66 swing the cassette into the loading plane as viewed in FIG. 5. The cassette is then in position to be readily grasped and removed from the unit by an operator.

Figure 8:
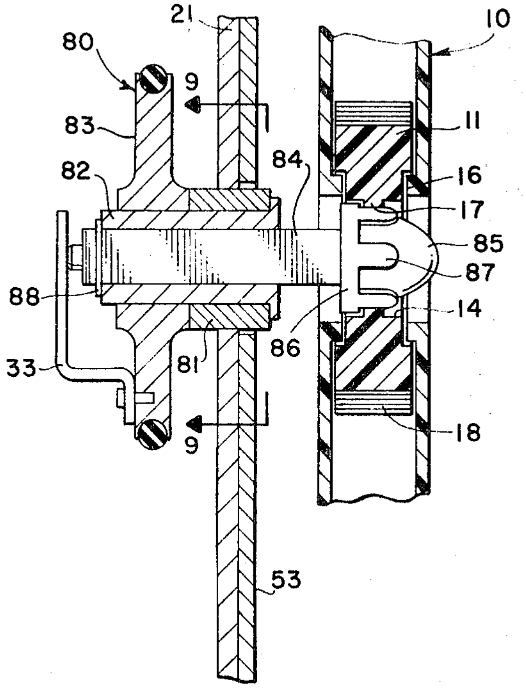
FIG. 8 is a fragmentary vertical sectional view taken through a drive spindle, similar to FIG. 3, showing an alternative form of spindle assembly according to the invention.
Figure 9:
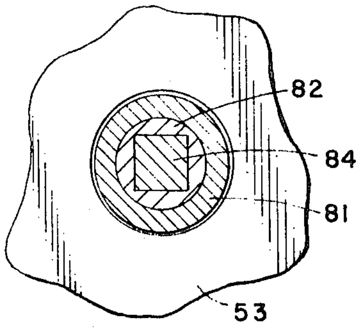
FIG. 9 is a sectional view taken along the line 9—9 of FIG. 8.
Figure 10:
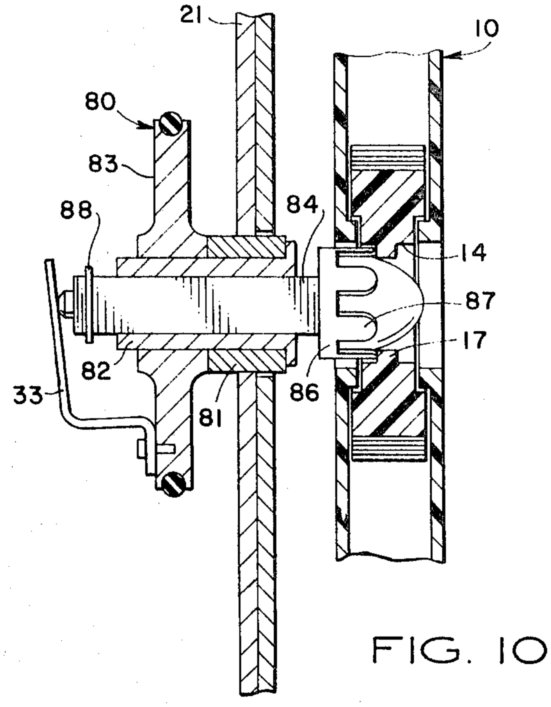
FIG. 10 is a fragmentary sectional view, similar to FIG. 8, showing the spindle in a displaced position.

FIGS. 8, 9 and 10 of the drawing illustrate an alternative form of spindle assembly for driving the cassette spools; and also an alternative form of hub for engagement with the toothed bores of the spool. FIGS. 8 and 10 are fragmentary views of a tape unit similar to that illustrated in FIGS. 1 through 7 showing the frame front plate 21, the face plate 23, and the cassette 10 in the operating position relative to the front plate 21. The spindle assembly 80 includes a sleeve 82 which is rotatably supported in a bushing 81 mounted in the front plate 21. At its outer end, the sleeve is provided with a flange engaging the outer face of the bushing 81; and a drive wheel 83 is nonrotatably mounted on the inner end of the sleeve 82, in any suitable manner, so that the drive wheel 83 and sleeve 82 rotate relative to the bushing and are confined against axial movement. A drive wheel may be provided with a rubber tire about its periphery to facilitate drive of the wheel by a driving shaft (not shown).

The sleeve 82 is provided with an axial bore of noncircular cross section, the bore being shown as having a square cross section to accommodate, in sliding relation, a square shaft which extends through the sleeve bore. The sleeve bore and shaft 84 may have other coacting configurations, such as a splined configuration to affect rotation of the shaft by the sleeve while permitting axial movement of the shaft. A hub 85 is integral with, or nonrotatably fixed to, the shaft 84.

The hub 85 is designed to maintain a relatively snug engagement with the bore 14 of the spool 11; and for this purpose the hub defines at its inner end a cylindrical portion 86 which has a diameter only slightly smaller than the diameter of the spool bore 14. Extending forward from the cylindrical portion 86 are six longitudinal splines 87 which define a continuation of a cylindrical or tapered surface portion 86 and, therefore, engage relatively closely the spool bore 14. The longitudinal recesses between the splines accommodate the teeth 17 of the spool, and the relative dimensions are relatively close to minimize backlash between the hub and spool.

FIG. 8 of the drawings shows the hub and the spool in normal driving relation; while FIG. 10 shows the condition where the cassette has been moved into the operating plane, and the hub 85 and the shaft 84 have yielded because of alignment of the spool teeth 17 and the hub splines 87. The inner end of the shaft 84 is provided with a boss engaged by the spring 33 carried by the drive wheel; and, in this configuration, only the hub and shaft yield axially with the shaft sliding within the bushing 82. Again, upon slight rotation the hub will be urged by the spring into the normal driving relation of FIG. 8. A retainer ring 88 defines the normal position of the shaft and hub.

Figure 11:
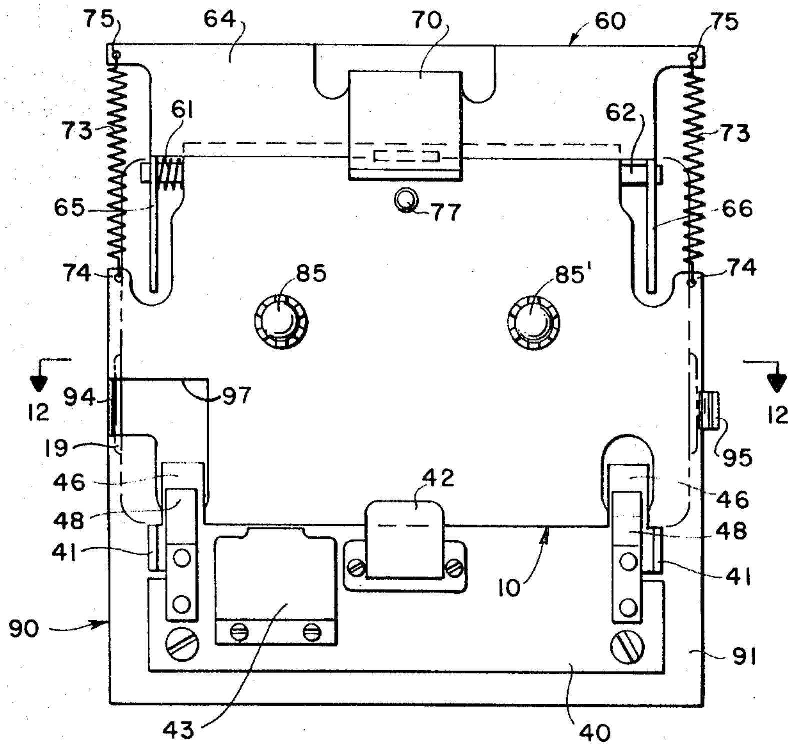
FIG. 11 is a front elevation of a modified form of a cassette holder according to the invention, with the position of the cassette shown in phantom lines.
Figure 12:
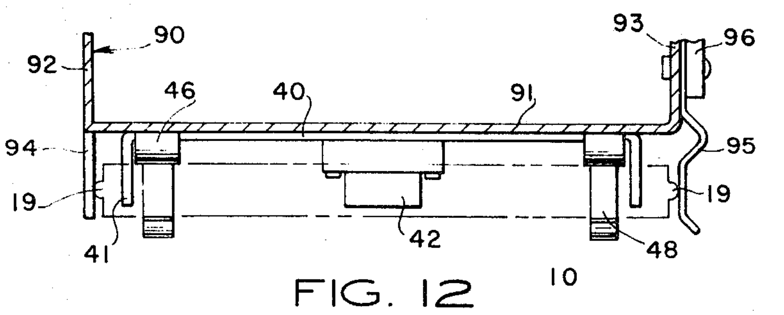
FIG. 12 is a horizontal sectional view taken along the line 12—12 of FIG. 11.

FIGS. 11 and 12 of the drawing illustrate a tape unit similar to that described in FIGS. 1 through 7, but including an alternative structure for guiding and limiting lateral movements of the cassette relative to the unit. In the unit shown in FIGS. 11 and 12, the parts corresponding to those of FIG. 1 bear the same reference numerals.

In the unit of FIGS. 11 and 12, the lower edge of the cassette is supported by the arms 41 of the mounting plate 40, as already described; and the plane of the cassette lower edge is defined by the bosses 46 and spring clips 48 as described. In this unit, however, there is no face plate 53 which performs the functions of lateral positioning of the cassette. In this configuration, the supporting frame 90 which includes a front plate 91, and side plates 92 and 93 for mounting the frame in associated apparatus, has a slightly different configuration from that of the frame 20. An arm 94 extends forwardly from the front plate 91 defining an extension of the sideplate 92; this arm 94 being formed, for example, from a cutout 97 in the front plate. The cassette 10 is indicated in phantom lines in these figures; and it will be seen that one of the side edge ribs 19 of the cassette is engaged and guided by the fixed arm 94. A spring arm 95 is mounted on the opposite sideplate 93, being secured thereto by means of a suitable backing plate 96; the spring arm extending forwardly from the front plate 91 to engage the edge rib 19 on the opposite side of the cassette 10.

Both the arm 94 and the spring 95 are positioned to guide and position the cassette laterally while it is being inserted into the loading plane in engagement with the support members 41, 46, and 48, The spring 95, then, urges the cassette to the left against the arm 94 to laterally locate the cassette whether it is disposed in the loading plane or the operating plane.

The overall operation of the unit then with the modification of FIGS. 8 through 10 or the modification of FIGS. 11 and 12 is the same as that described.

What has been described is improved tape cassette holder means in a tape unit, in which the recording head, and possibly other components coacting with the cassette, are disposed at the bottom of the cassette-receiving compartment. A feature of the invention is the means for guiding the cassette into the appropriate operating plane, for precisely locating the cassette both vertically and laterally, and for confining the cassette against vertical and lateral movements within the operating plane. Another feature of the invention is the latching mechanism which automatically latches the cassette in proper position within the operating plane, and which readily releases the cassette from the operating plane for convenient removal by an operator. Another feature of the invention is the design of the drive spindles which yield in the event of rotational misalignment between the drive hubs and cassette spools and which immediately achieve driving relation upon relative rotation. Another feature of the invention is the hub design which provides for concentricity between the driving hubs and the cassette spools. Still another feature of the invention is the mounting arrangement for the cassette which provides for access to the edge of the cassette for mounting other components which coact with the tape moving adjacent to the cassette edge.

Although the invention has been described with reference to particular preferred embodiments, other changes and modifications will become apparent to those skilled in the art in view of the foregoing description which is intended to be illustrative and not limiting of the invention defined in the claims.

What is claimed is:

1. A tape unit for use with a rectangular tape cassette comprising a frame; support means on said frame for supporting and positioning the lower portion of the cassette in both loading and operating planes;

a recording head mounted on said frame in the operating plane for engagement with the tape transported adjacent to the bottom edge of the cassette; a pair of spindle assemblies mounted on said frame, having drive hubs positioned in the operating plane for driving engagement with the cassette spools;

latch means hingedly mounted on said frame for movement between latch and unlatch positions; said latch means having at least one positioning arm for engagement, in the unlatch position thereof, with the cassette to position the cassette in the loading plane; and said latch means having a latching arm for engagement, in the latch position thereof, with the upper portion of the cassette to retain the cassette in the operating plane.

2. A tape unit as set forth in claim 1 wherein said support means comprises common means for supporting and positioning the lower portion of the cassette in both the loading and operating planes.

3. A tape unit as set forth in claim 1 wherein said recording head is mounted for engagement with the cassette tape in both the operating and loading planes.

4. A tape unit as set forth in claim 1 wherein said support means includes means for engaging the cassette side edges for lateral positioning thereof.

5. A tape unit as set forth in claim 2 wherein said support means includes bracket means defining a bottom edge support, means for holding the lower edge in spaced relation to the frame, and means for engaging the cassette side edges for lateral positioning thereof.

6. A tape unit as set forth in claim 1 including overcenter spring means for urging and maintaining said latch means in both said latch position and said unlatch position.

7. A tape unit as set forth in claim 1 wherein said latch means includes arm means for engagement with the cassette top edge in the operating plane to urge said cassette into engagement with the bottom edge support means.

8. A tape unit as set forth in claim 1 wherein said spindle assembly driving hubs are normally urged into the operating plane and are movable axially out of the operating plane.

9. A tape unit as set forth in claim 8 wherein said spindle assemblies include drive shafts mounted on said frame for axial movement relative thereto; and yieldable spring means for normally urging said drive shafts to position said drive hubs in the operating plane.

10. A tape unit as set forth in claim 8 wherein said spindle assemblies each include a drive wheel rotatably mounted on said frame, a drive shaft extending through said wheel being axially slidable and non-rotatably coupled thereto, and a drive hub being non-rotatably coupled to said shaft; and spring means yieldably urging said shaft to position said hub in the operating plane.

11. A tape unit as set forth in claim 4 wherein said lateral positioning means includes a spring plate mounted on said frame having resilient confronting end walls for engagement with the cassette side edges.

12. A tape unit as set forth in claim 4 wherein said lateral positioning means includes rigid arm means on said frame for engagement with said side edge of said cassette and resilient means mounted on said frame for engagement with the other side edge of said cassette to urge said cassette towards said first side edge engaging means.

13. A tape unit as set forth in claim 10 wherein each drive hub includes a tapered front portion and a number of side splines equal to the number of teeth in the bore of each spool of the cassette, the width of each spline being only slightly less than the spacing between the teeth whereby substantially no relative rotation is permitted between the drive hub and the spool when the hub is received in the bore of the spool.

14. A tape unit for use with a flat rectangular tape cassette comprising:

a frame member defining an upright mounting face; a pair of drive spindle assemblies rotatably mounted on said frame member, including drive hubs extending from said face;

a support member mounted on said frame member face for supporting the lower edge of a cassette; said support member including means for mounting a tape-recording head, first means for engaging or locating the bottom edge of the cassette, second means for engaging and locating the lower inner wall of the cassette, and third means for engaging the lower outer wall of the cassette and urging the cassette against said second means; said support member supporting the cassette bottom edge in both loading and supporting planes;

latch means hingedly mounted on said frame member about a horizontal axis, for supporting the upper portion of the cassette; said latch means including fourth means for engaging the cassette inner wall, fifth means for engaging the top edge of the cassette, and sixth means for engaging the upper outer wall of the cassette; means urging said latch means to a first position, wherein said fourth means extends outwardly from the frame face to engage the cassette inner wall to position the cassette in the loading plane at an angle relative to said frame face; means urging said latch means to a second position wherein said fifth means urges the cassette downward into engagement with said first means and wherein said sixth means retains the cassette in the operating plane parallel to said frame face with the spindle assembly hubs received in the cassette spools.